Figure 1:
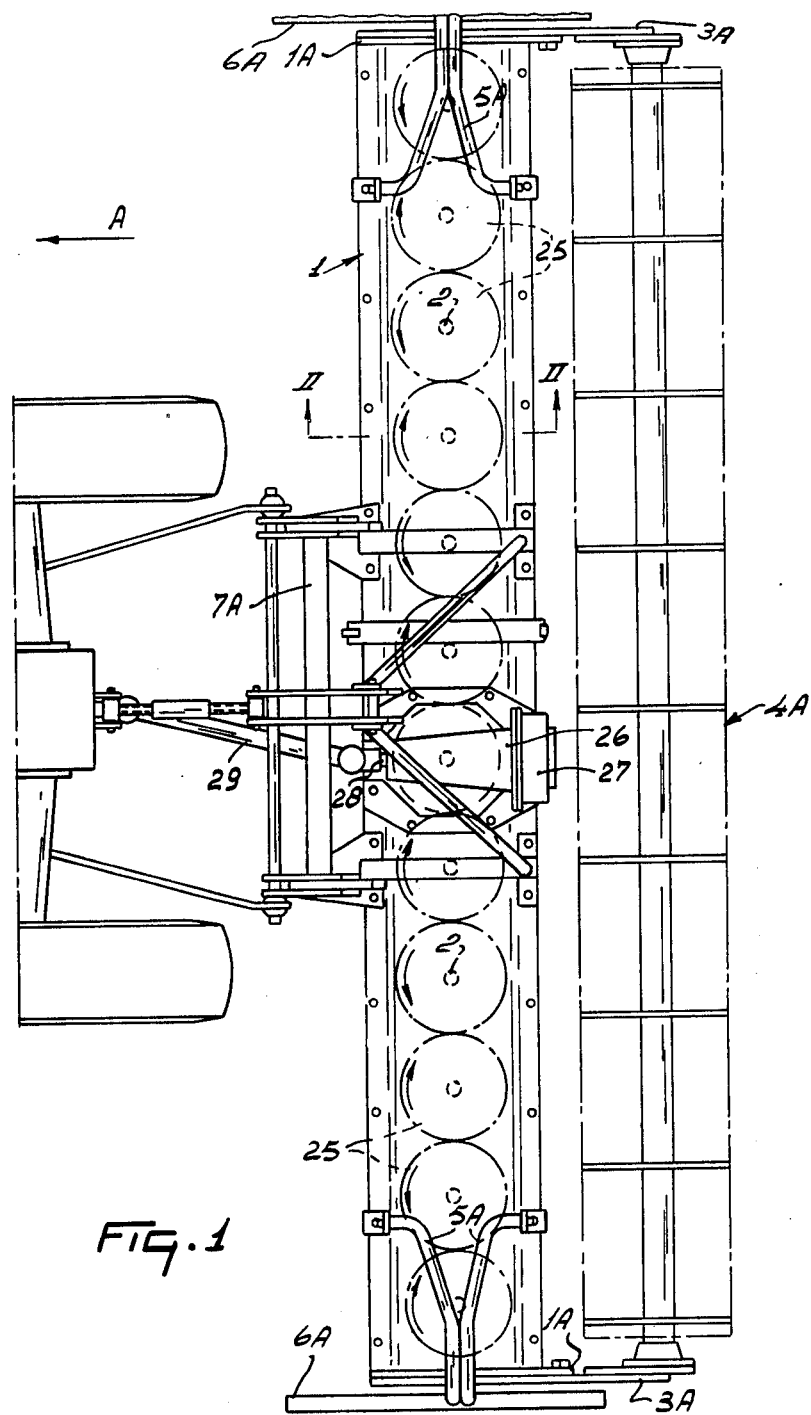

United States Patent [19]

van der Lely

[11] 4,034,814
[45] July 12, 1977

[54] ROTARY HARROWS

[76] Inventor: Cornelis van der Lely, 7, Bruschenrain, Zug, Switzerland

[21] Appl. No.: 611,795

[22] Filed: Sept. 9, 1975

[30] Foreign Application Priority Data

Sept. 11, 1974 Netherlands ..................... 7412052

[51] Int. Cl.² .................. A01B 33/06; A01B 33/10
[52] U.S. Cl. .................................. 172/59; 172/700; 172/707; 172/711; 172/526
[58] Field of Search ................... 172/50, 51, 52, 59, 172/705, 523, 111, 49, 685, 707, 708, 711, 700, 526

[56] References Cited

U.S. PATENT DOCUMENTS

| | | | |
|---|---|---|---|
| 1,697,677 | 1/1929 | Davidson | 172/59 |
| 3,169,583 | 2/1965 | Thurow | 172/59 X |
| 3,783,948 | 1/1974 | van der Lely et al. | 172/59 X |
| 3,841,411 | 10/1974 | van der Lely et al. | 172/59 X |

*Primary Examiner*—George J. Marlo
*Attorney, Agent, or Firm*—Mason, Mason & Albright

[57] ABSTRACT

A cultivator or harrow has a row of soil working members and each of these members is a rotatable support on a shaft that is driven to rotate about an upwardly extending axis. Each support is comprised by two similar diametrically opposed portions and each portion has a lower tine and an upper tool that differs in shape and form from the lower tine. The upper tool can be a pair of different tines or a tine-like extension of the support portion that functions as a rigid tine. The lower more resilient tine works the sub-soil and the upper tool works the topsoil. The lower tines of the two portions can be a single element of spring steel that is retained by quick release pins in lower support recesses and the fastening portions of the lower tines can bear on the heads of further pins that retain upper tines in their corresponding recesses so that one release means retains all of the tools on each support portion.

13 Claims, 7 Drawing Figures

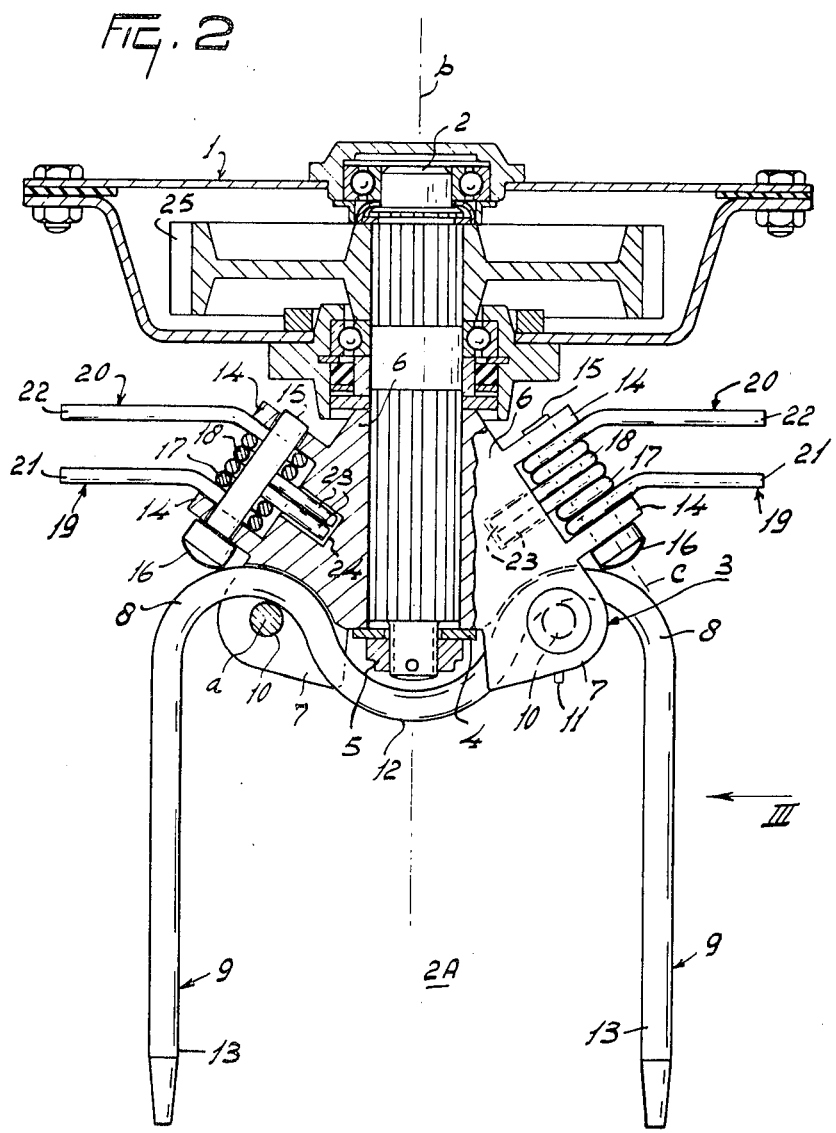

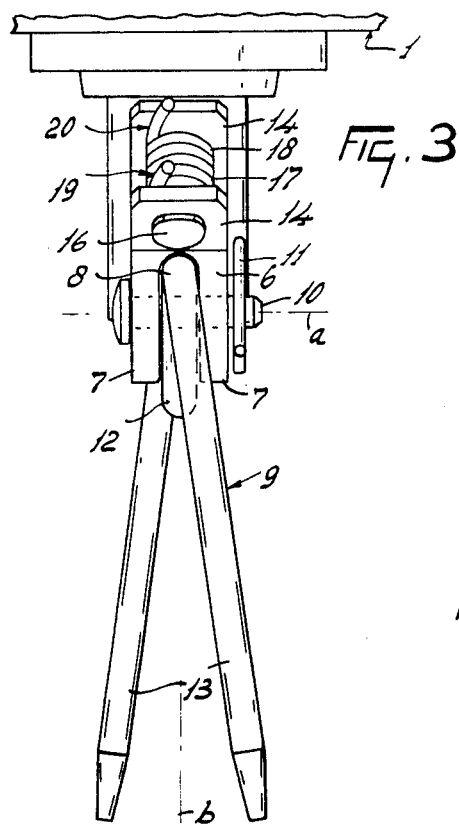
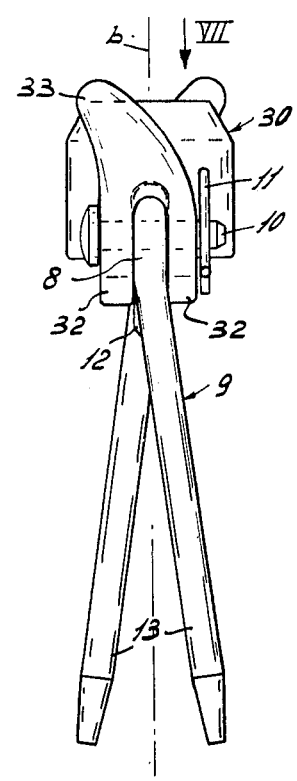
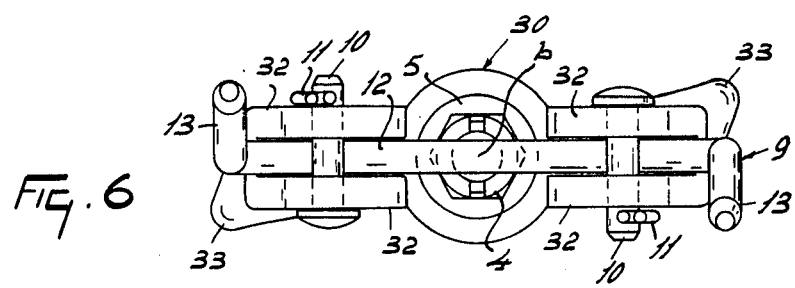
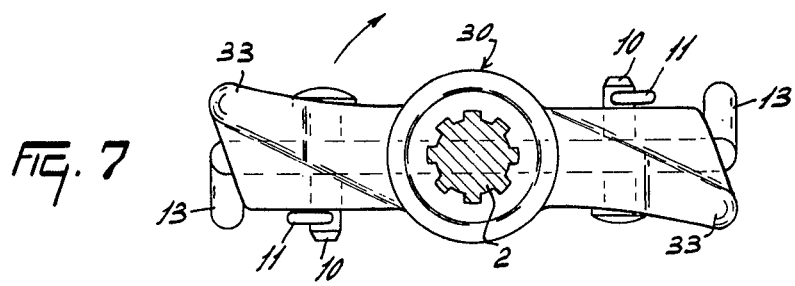

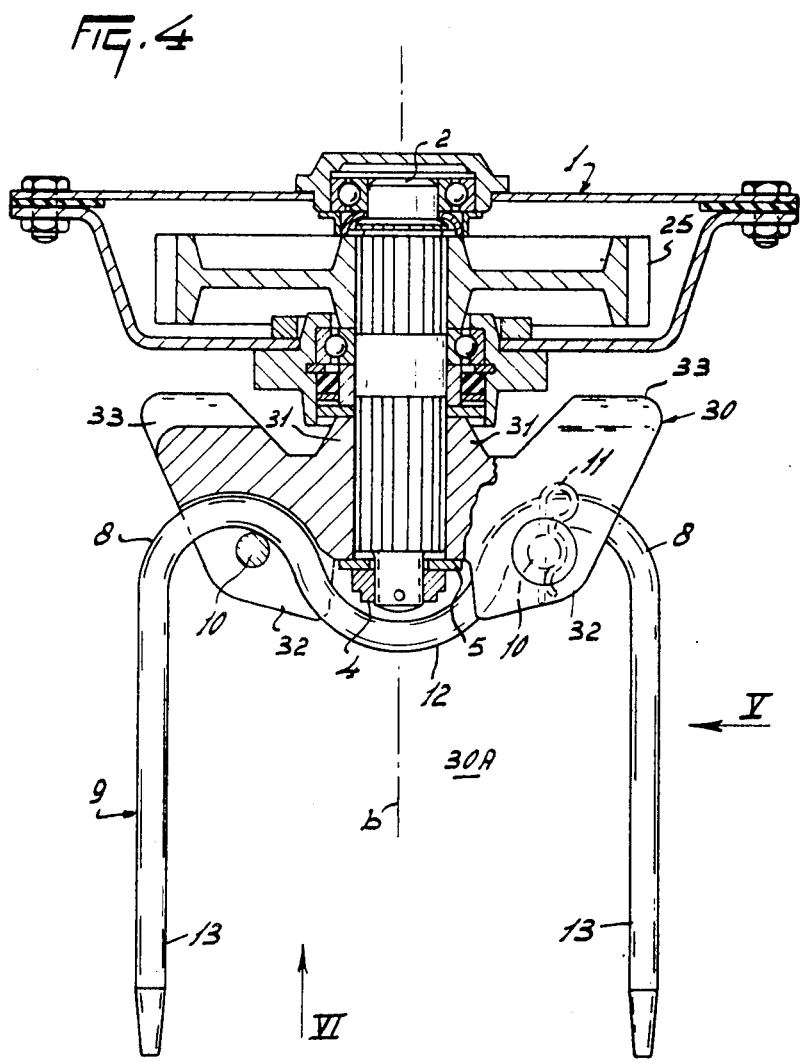

ROTARY HARROWS

For a better understanding of the invention, and to show how the same may be carried into effect, reference will now be made, by way of example, to the accompanying drawings, in which:

FIG. 1 is a plan view of a soil cultivating implement or rotary harrow in accordance with the invention connected to the rear of an agricultural tractor, FIG. 2 is a section, to an enlarged scale, taken on the line II—II in FIG. 1, FIG. 3 is an elevation as seen in the direction indicated by an arrow III in FIG. 2, FIG. 4 is a section, to an enlarged scale, taken on the line II—II in FIG. 1 but illustrates an alternative construction to that of FIGS. 1 to 3, FIG. 5 is an elevation as seen in the direction indicated by an arrow V in FIG. 4, FIG. 6 is an underneath plan view as seen in the direction indicated by an arrow VI in FIG. 4, and FIG. 7 is a part-sectional plan view as seen in the direction indicated by an arrow VII in FIG. 5.

The soil cultivating implements or rotary harrows that are to be described will hereinafter be referred to, throughout the remainder of the descriptive portion of this Specification, merely as rotary harrows for the sake of brevity. Referring to FIGS. 1 to 3 of the drawings, the rotary harrow that is illustrated therein comprises a hollow box-shaped frame portion 1 that extends substantially horizontally transverse, and normally substantially horizontally perpendicular, to the intended direction of operative travel of the harrow which is indicated in FIG. 1 by an arrow A. A plurality (in this case, twelve) of upwardly extending and normally vertical or substantially vertical shafts 2 are rotatably journalled in upper and lower ball bearings that are carried by the frame portion 1 in such a way that their axes of rotation $b$ (FIGS. 2 and 3) are spaced apart from one another at regular distances that it is preferred should have magnitudes of substantially 25 centimeters. Each shaft 2 is provided, beneath the bottom of the frame portion 1, with a corresponding soil working member that will be described in greater detail below and that is generally indicated by the reference 2A. The opposite ends of the hollow box-shaped frame portion 1 are closed by substantially vertical sector plates 1A that both extend substantially parallel to the direction A. Arms 3A are turnable upwardly and downwardly alongside the sector-shaped end plates 1A of the frame portion 1 about a substantially horizontal axis that is defined by strong pivots (not visible) that are located at the tops and fronts of the sector plates 1A with respect to the direction A. Rows of holes are formed alongside the curved rear edges of the sector plates 1A at equal distances from the substantially horizontal pivotal axis that is defined by the pivotal connections of the arms 3A to said sector plates and the arms 3A themselves are formed with single holes that can be brought into chosen holes in the sector plates 1A by disposing said arms 3A in corresponding angular settings about the pivotal axis. Bolts whose heads can be seen in FIG. 1 of the drawings are provided for entry through the single holes in the arms 3A and through the chosen holes in the sector plates 1A and, when those bolts are tightened, the arms 3A are retained in their chosen angular settings relative to the frame portion 1. Rearmost and lowermost ends of the arms 3A carry substantially horizontally aligned bearings between which a rotatable supporting member in the form of an open ground roller 4A is mounted. The level of the axis of rotation of the roller 4A can be varied relative to that of the soil working members 2A by changing the angular settings of the arms 3A in the manner described above and it will be realised that the level of the roller 4A that is chosen is a principal factor in determining the depth of penetration of tines 9 (FIG. 2) of the soil working members 2A into the soil that is possible during operation of the rotary harrow.

Shield plates 6A that are normally substantially vertically disposed in substantially parallel relationship with the direction A are located immediately beyond the opposite ends of the single row of soil working members 2A and each plate 6A is pivotally connected to a corresponding pair of brackets on top of the frame portion 1 by a corresponding pair of arms 5A. The pivotal connections of the arms 5A to the brackets define axes that extend substantially horizontally parallel to the direction A and the shield plates 6A can thus turn upwardly and downwardly to some extent about those pivotal axes, during operation of the harrow, to match undulations in the surface of the ground over which the lower edges of the plates 6A slide during operative progress of the harrow. The shield plates 6A minimise ridging of the soil at the edges of the broad strip of land that is cultivated by the soil working members 2A and reduce the number of stones and the like that are flung laterally of the path of travel to the harrow by its rapidly rotating soil working members 2A.

Each shaft 2 has upper and lower longitudinally extending splines, the lower splined portion of each shaft projecting from beneath a corresponding bearing housing at the bottom of the frame portion 1. The downwardly projecting splined portion co-operates with a corresponding internally splined support 3 which is prevented from becoming detached from the shaft 2 concerned by a washer 4 and a fastening nut 5, the latter co-operating with the screwthread of a short screwthreaded stub shaft at the extreme lower end of the shaft 2 concerned. As is illustrated in outline in FIG. 2 of the drawings, the retaining nut 5 is preferably provided with a transverse split pin or the like to prevent it from working loose during operation of the harrow. Each support 3 comprises two portions 6 which are diametrically opposed with respect to the corresponding axis of rotation $b$, each portion 6 being formed with two parallel but spaced apart lugs 7 at its lower end. The space between each pair of lugs 7 accommodates a curved fastening portion 8 of the corresponding tine 9, said portion 8 being upwardly convex and being prevented from falling downwardly from between the corresponding lugs 7 by a transverse headed pin 10 that is entered perpendicularly through the pair of lugs 7 concerned. The head of each pin 10 bears against one lug 7 of the corresponding pair while the opposite end of that pin, that is located beyond the relatively remote surface of the other lug 7 of the pair, is formed with a transverse bore which receives one limb of a resilient "safety" pin 11 (FIGS. 3 and 4) that is of a construction which is known per se. As can be seen in the drawings, the longitudinal axes $a$ of the pins 10 are substantially perpendicular to the axes of rotation $b$ of the corresponding shafts 2 but are in non-intersecting spaced relationship with those axes $b$.

The fastening portions 8 of the two tines 9 of each soil working member 2A are integrally interconnected by a downwardly convex curved connecting part 12 whose concave side passes beneath the lower end of the corresponding shaft 2 and its fastening nut 5. In the embodiment which is being described, the tines 9 and the corresponding connecting parts 12 are made integrally from single lengths of spring steel or other, preferably metallic, resilient material that is of circular or substantially circular cross-section. The diameter, as seen in cross-section, of the spring steel or other material is preferably substantially 15 millimeters and the configuration is such that, as seen in FIG. 2 of the drawings, an approximately M-shaped unit is produced.

The ends of the fastening portions 8 of each pair of tines 9 that are remote from the corresponding connecting part 12 merge integrally into two straight soil working portions 13 whose lowermost free ends are tapered to form blunt tips. As can be seen in FIG. 3 of the drawings, each soil working portion 13 is inclined rearwardly from top to bottom by a few degrees with respect to the intended direction of operative rotation of the corresponding soil working member 2A (see the arrows in FIG. 1 of the drawings) so that the tines 9 may be said to trail with respect to those directions. Each of the diametrically opposed portions 6 of each soil working member 2A is formed, above the corresponding lugs 7, with two spaced lugs 14 that are perpendicular or substantially perpendicular to the oblique substantially flat outer surface of the portion 6 concerned. The outer surfaces of the two portions 6 of each support 3 are in upwardly convergent relationship as can be seen best in FIG. 2 of the drawings. Each pair of upper and lower lugs 14 is formed with aligned holes through which a corresponding pin 15 having a head 16 at one end is entered upwardly. Each pin 15 extends substantially parallel to the oblique outer surface of the portion 6 of the corresponding support 3 alongside which it is located. As shown in FIG. 2 of the drawings, the upper surface of each head 16 bears against the lower surface of the corresponding lug 14 while the free upper end of the corresponding pin 15 is located just above the upper surface of the corresponding upper lug 14. The pins 15 are prevented from moving axially downwards out of the holes in the lugs 14 by abutment of the lower surfaces of their heads 16 against the tops of the fastening portions 8 of the corresponding tines 9 which tines are, of course, installed after installation of the pins 15.

Each pin 15 is surrounded, between the corresponding pair of lugs 14, by tightly pitched coils 17 and 18 that afford fastening portions of corresponding lower and upper tines 19 and 20. The lower tines 19 comprise substantially horizontal operative or soil working portions 21 and the upper tines 20 comprise substantially parallel operative or soil working portions 22, said operative portions 21 and 22 of each pair being located one above the other so as to project sideways in opposite directions from the corresponding shaft 2 as seen in FIG. 2 of the drawings. In fact, the substantially parallel operative portions 21 and 22 are slightly curved throughout their lengths in such a way that their outer free ends are directed rearwardly with respect to the intended direction of operative rotation of the corresponding soil working member 2A, the slightly curved configuration thereof being visible in FIG. 3 of the drawings. Where the coils 17 and 18 of each pair of tines 19 and 20 meet substantially midway between the corresponding pair of lugs 14, those coils are provided with substantially abutting straight free ends 23 that are entered, together, into corresponding larger diameter blind recesses 24 which are formed in the material of the corresponding portions 6. The portions 17, 21 and 23 of each tine 19 and the portions 18, 22 and 23 of each tine 20 are each formed integrally from a single length of spring steel or other, preferably metallic, resilient material that is of circular or substantially circular cross-section, that cross-section preferably having a diameter of substantially 6 millimeters.

As mentioned above, the pins 15 are maintained in their operative positions by abutment of their heads 16 against the fastening portions 8 of the immediately underlying tines 9 but each pin 15 is loosely, rather than rigidly, entered through the holes in the corresponding lugs 14, and through the coils 17 and 18, so that it can be immediately withdrawn downwardly as soon as the corresponding tine fastening portion 8 no longer prevents that. According, each pin 10 (and its co-operating "safety" pin 11) affords a quickly releasable fastening which can retain not less than two tines in their operative positions and which, in the embodiment that has been described, retains three tines in their operative positions on the corresponding support 3. Each pin 15 is non-perpendicularly inclined to the corresponding axis of rotation $b$ and is disposed with its free unheaded end uppermost and nearer to that axis $b$ than is the head 16 at the lowermost end thereof. As seen in FIG. 2 of the drawings, the longitudinal axis $c$ of each pin 10 intersects the axis of rotation $b$ of the corresponding shaft 2 in such a way that the acute angle enclosed between said axes $b$ and $c$ opens downwardly. With this construction, each pin 15 is located substantially directly above the corresponding quickly releasable headed pin 10.

The upper splined region of each shaft 2 is provided, inside the hollow frame portion 1, with a corresponding straight-toothed or spur-toothed pinion 25 and it will be evident from FIG. 1 of the drawings that each pinion 25 has its teeth in mesh with those of its neighbour, or both of its neighbours, in the single row thereof. One of the center pair of shafts 2 has an upward extension into a gear box 26 that is mounted on top of the frame portion 1. Bevel pinions within the gear box 26 place the shaft extension in driven mesh with a substantially horizontal shaft (not visible) that extends substantially parallel to the direction A. The rearmost end of the substantially horizontal shaft, and the rearmost end of an overlying and parallel substantially horizontal shaft 28, are both entered through the rear wall of the gear box 26 into a change-speed gear 27. The end of said parallel substantially horizontal shafts are both splined inside the change-speed gear 27 and can receive a chosen pair of a number of pairs of interchangeable and/or exchangeable pinions so as to give a corresponding transmission ratio between the upper shaft 28 and the underlying substantially horizontal shaft that is not visible in the drawings. This enables the soil working members 2A to be rotated at different speeds without having to change the input speed of rotation that is applied to the upper shaft 28 by the power take-off shaft of an agricultural tractor or other preparing vehicle. The shaft 28 has a splined or otherwise keyed end which projects forwardly from the front of the gear box 26 in substantially the direction A and which is arranged to be placed in driven connection with the power take-off shaft of an agricultural tractor or other operating vehicle by employing a telescopic transmission shaft 29 that is of known construction having universal joints at its opposite ends. The front of the frame portion 1 with respect to the direction A is provided with a generally triangular coupling member or testle 7A that is constructed and arranged for connection to the three-point lifting device or hitch of an agricultural tractor or other operating vehicle in a manner which is known per se and which is illustrated in outline in FIG. 1 of the drawings.

In the use of the rotary harrow that has been described with reference to FIGS. 1 to 3 of the drawings, its coupling member or trestle 7A is connected to the three-point lifting device or hitch or an agricultural tractor or other operating vehicle in the generally known manner that is illustrated in outline in FIG. 1 of the drawings and the forwardly projecting splined or otherwise keyed end of the upper substantially horizontal shaft 28 in the gear box 26 is placed in driven connection with the power take-off shaft of the same agricultural tractor or other operating vehicle by means of the telescopic transmission shaft 29 that has universal joints at its opposite ends. An appropriate pair of pinions is employed in the change-speed gear 27 to give a speed of rotation of the soil working members 2A that will produce the required soil consistency after working having regard to the initial nature and condition of that soil. Moreover, the arms 3A will have been bolted into angular settings about their pivotal connections to the sector plates 1A that are designed to maintain the level of the axis of rotation of the roller 4A so that the tines 9, 19 and 20 of the soil working members 2A will penetrate into the soil to the desired depth having regard to substantially the same operating factors as are discussed above. As the machine moves forwardly in the direction A, each soil working member 2A will work a strip of soil having a width of substantially 30 centimeters and, since the axes of rotation $b$ of the shafts 2 are spaced apart from one another by distances that are preferably substantially 25 centimeters, the individual strips of soil overlap one another to produce, in effect, a single broad strip of worked soil. Neighbouring soil working members 2A have their tines 9, 19 and 20 angularly staggered apart from one another around the corresponding axes b so that said tines will not foul one another during rotation of the soil working members 2A.

The soil is worked very effectively by the tines 9, 19 and 20, those tines being formed from resilient material, being located one above the other, and diametrically opposite to each other around the corresponding axes $b$. The different shapes and thicknesses of the tines 9 from the tines 19 and 20 gives those tines differing degrees of resilience, the more resilient tines 19 and 20 moving through the topsoil while the less resilient tines 9 penetrate downwardly into the subsoil and break it up into coarser particles than the finely divided uppermost layer of the topsoil. A very satisfactory seed bed can, in this way, usually be produced by a single traverse of the rotary harrow, at least the uppermost layer of the topsoil being very finely divided while underlying layers are less finely crumbled. This gives substantially optimum conditions for seed germination and growth having regard to the distribution of air and moisture in the relatively finely and relatively coarsely crumbled layers of soil. As described above, the pins 10 which fasten the tines 9 in their operative positions also indirectly fasten the tines 19 and 20 in their operative positions since the mounting or fastening pins 15 for the tines 19 and 20 are retained against withdrawal by the fastening portions 8 of the lower tines 9 once the pins 10 are installed.

FIGS. 4 to 7 inclusive of the drawings illustrate an alternative construction in which, however, a number of parts are similar or identical to parts that have already been described with reference to FIGS. 1 to 3. Accordingly, such parts are indicated in FIGS. 4 to 7 of the drawings by the same reference as are employed in FIGS. 1 to 3 and will not be described in detail again. In the embodiment of FIGS. 4 to 7 of the drawings, the soil working members 2A are replaced by soil working members 30A each of which members 30A comprises a support 30 which has two portions 31 that are diametrically opposed at opposite sides of the corresponding axis of rotation $b$. The bottom of each portion 31 is formed with two substantially vertically disposed but substantially horizontally spaced apart lugs 32 between which the curved fastening portions 8 of integral pairs of the tines 9 are releasably retained by the headed pins 10 and the resilient "saftey" pins 11 as has already been described with reference to FIGS. 1 to 3 of the drawings. The top of each portion 31 has an upwardly and laterally bent-over tine-like extension 33 that is orientated forwardly with respect to the intended direction of operative rotation of the corresponding soil working member 30A (see the arrow in FIG. 7 of the drawings). As seen in side elevation (FIG. 5), each extension 33 tapers upwardly and forwardly to a rounded blunt point. The surface of each extension 33 that is furthest from the corresponding axis of rotation $b$ is in substantial register, in a direction parallel to that axis $b$, with the underlying soil working portion 13 of the corresponding tine 9 (see particularly FIG. 7 of the drawings). In the construction of FIGS. 4 to 7 of the drawings, the extensions 33 of the tine supports 30 themselves act to crumble the uppermost layer or layers of the soil during operation of the rotary harrow, the degree of crumbling of the uppermost layer or layers that is produced being, however, generally less fine than is produced when the tines 19 and 20 of the first embodiment are employed. A coarser final condition of the top soil is a required result under some operating conditions.

Although various features of the rotary harrows that have been described and/or that are illustrated in the accompanying drawings will be set forth in the following claims as inventive features, it is emphasised that the invention is not necessarily limited to those features and that it includes within its scope each of the parts of each rotary harrow embodiment that has been described and/or that is illustrated in the accompanying drawings, both individually and in various combinations.

What we claim is:

1. A soil-cultivating implement or rotary harrow comprising a frame and a plurality of soil-working members supported on said frame in a row that extends transverse to the normal direction of travel, at least one of said soil-working members being mounted on an upwardly extending shaft and comprising a support on said shaft, at least two soil-working tools connected to said support at the same side of the shaft, one above the other, and each tool being spaced laterally from said shaft, each of said two tools comprising a resilient tine and the tines of said two tools being deflectable above axes, the axes about which the tines are deflectable being inclined to one another.

2. A harrow as claimed in claim 1, wherein an upper tine is made from thinner and more resilient material than a lower tine, whereby the upper layer of soil worked by the soil-working member is more finely divided than the subsoil.

3. A harrow as claimed in claim 1, wherein at least one tine on a first upper tool has a soil-working portion which extends outwardly with respect to said upwardly extending axis of rotation, said soil-working portion extending substantially horizontally.

4. A harrow as claimed in claim 3, wherein said upper tine soil-working portion is bent over rearwardly with respect to the normal direction of rotation of said soil-working member.

5. A harrow as claimed in claim 4, wherein said upper tine soil-working portion is curved in configuration throughout substantially its entire length.

6. A harrow as claimed in claim 1, wherein a tine of a lower tool has a soil-working portion which extends rearwardly in a trailing position with respect to the normal direction of rotation of said soil-working member and said soil-working portion is substantially straight.

7. A harrow as claimed in claim 1, wherein each soil-working member has at least two tines which have corresponding fastening portions and said fastening portions are connected to said support with at least one quick releasable fastening.

8. A harrow as claimed in claim 1, wherein said soil-working member comprises at least two tines in substantially vertically spaced apart relationship at each of two opposite sides of said shaft.

9. A harrow as claimed in claim 8, wherein there are two diametrically opposed, lower tines which are formed from a single length of resilient material.

10. A harrow as claimed in claim 1, wherein the tine of each tool is deflectable about a corresponding pin that is received in lug means of said support, said pins being removable from the support and the tines being releasable with respect to the soil-working member.

11. A harrow as claimed in claim 1, wherein said two tines are located substantially one above the other.

12. A harrow as claimed in claim 11, wherein the lower tine is less resilient than the upper tine.

13. A soil-cultivating implement or rotary harrow comprising a frame and a plurality of soil working members supported on said frame in a row that extends transverse to the normal direction of travel, at least one of said soil-working members being mounted on an upwardly extending shaft and comprising a support on said shaft, at least two soil-working tools connected to said support at the same side of the shaft and each of side two tools being spaced laterally from said shaft and comprising at least one resilient tine that is deflectable about a respective axis the axes about which said tines are deflectable being inclined to one another, the tine of a first tool having a different degree of resilience than the tine of a second tool and the soil-working portion of a first tine being located above the soil-working portion of the second tine.

* * * * *